United States Patent Office 3,283,151
Patented Nov. 1, 1966

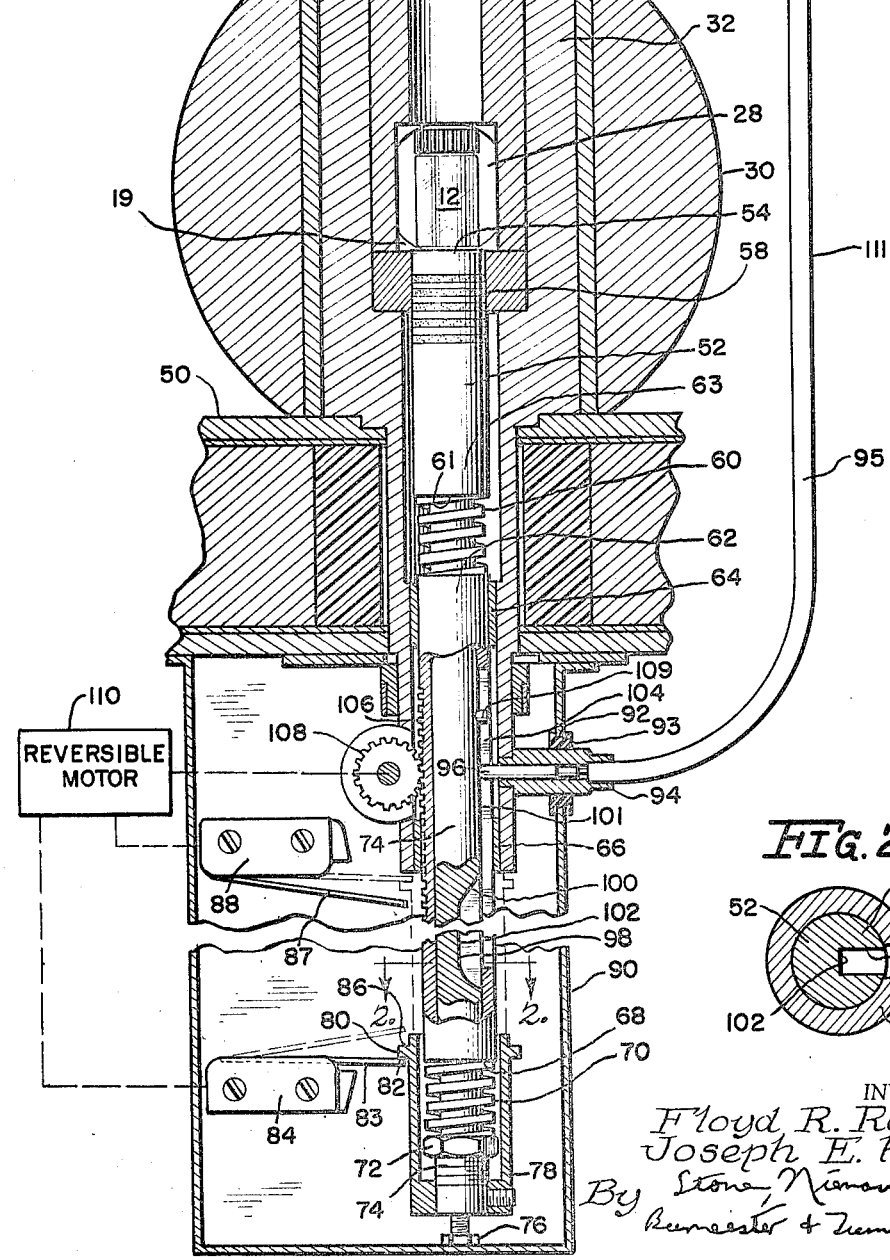

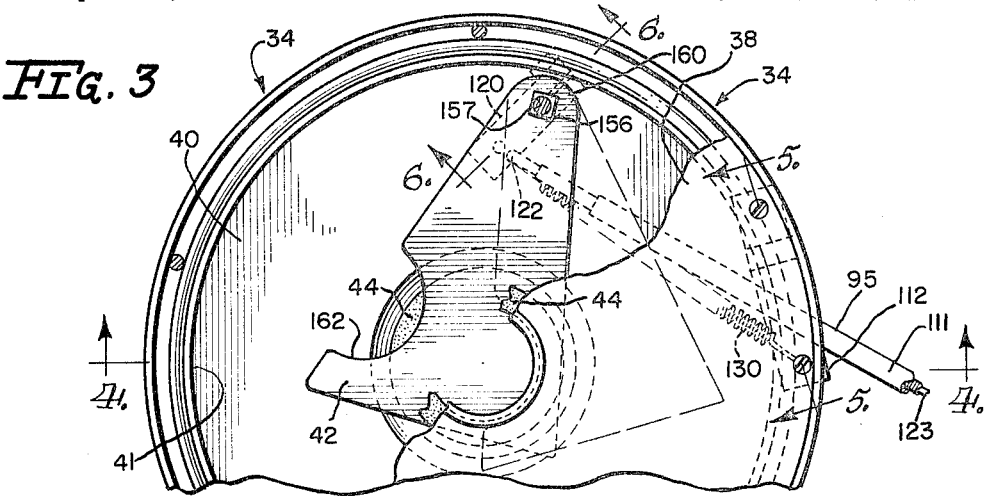

3,283,151
AUTOMATIC SAMPLE CHANGER FOR
SCINTILLATION COUNTING
Floyd R. Rowan, Chicago, and Joseph E. Kus, Mount Prospect, Ill., assignors to Nuclear-Chicago Corporation, Des Plaines, Ill., a corporation of Delaware
Filed Apr. 15, 1963, Ser. No. 273,064
15 Claims. (Cl. 250—71.5)

This invention relates to automatic measuring apparatus and in particular to a scintillation counting system incorporating novel construction features eliminating the substantial impairment of the desired operation which may otherwise be caused by incorporation in a large group of samples of one or a few improperly sized or prepared samples.

By the present invention, a sample producing maloperation or jamming is removed so that subsequent samples may continue to be measured. The invention, although of course being of broader utility, is herein illustrated and described in an embodiment comprising an improvement on the sample changer described in a co-pending U.S. patent application of Raymond L. Meeder and Joseph E. Kus, Serial No. 184,765, filed April 3, 1962, now Patent 3,163,756. A sample changer of this type has a series of samples carried by a conveyor system, each sample being individually deposited within a light-tight chamber adjacent to one or more photomultipliers capable of measuring the intensity of radioactivity of the sample as a result of the production of pulses of light due to the action of the radioactive substance upon the liquid scintillator matrix. The sample is moved into the chamber upon a light-sealing elevator, a light-sealing shutter moving into place over the chamber before the light seal of the elevator is broken. In operation a nonstandard sample bottle incorporated in a large group may sometimes become lodged in the passage connecting the chamber to the exterior. This occurs substantially entirely at the discontinuity in the passage wall produced by the gap used for operation of the shutter, so that such a malfunctioning sample is left behind by the elevator in its descent and is struck by the closing shutter.

In the device of the co-pending application mentioned, permanent damage to the mechanism and breakage of sample bottles are prevented in a manner therein described, but on the occurrence of such a sample-jamming the proper operation of the changer will in general cease, and the subsequent samples on the conveyor system will not be accurately tested or counted until the situation is seen and remedied. Since such devices are frequently operated unattended over weekends and similar long periods, and since in many cases, such as sample decay measurements, long delay is equivalent to complete loss of the samples, the consequences of lack of extreme care with regard to even a single sample have sometimes been of a seriousness substantially exceeding mere inconvenience. Further, the sensitive photomultipliers can under these circumstances be exposed to ambient light resulting in substantial destruction of their characteristics.

It is therefore the principal object of this invention to provide an automatic sample changer having a sample reject mechanism that will remove a jammed sample in order that samples subsequent to it may be subjected to measurement in a normal mode of operation, and particularly to provide such a mechanism which is simple and reliable and adds a minimum of complexity. The manner of achievement of this object, and other advantages afforded by the invention, will become more apparent by reference to the following description and the attached drawings, understanding that the disclosed embodiment is not meant to be a limitation upon the breadth and scope of the invention and that the invention may accordingly take other forms than herein specifically described. In the drawing:

FIGURE 1 is a view in vertical section of a scintillation counter sample changer embodying the invention;

FIGURE 2 is a fragmentary horizontal sectional view taken along line 2—2 of FIGURE 1 in the direction indicated by arrows;

FIGURE 3 is a horizontal sectional view taken along line 3—3 of FIGURE 1 in the direction indicated by arrows;

FIGURE 4 is a vertical sectional view taken along line 4—4 of FIGURE 3 in the direction indicated by arrows, with a shutter constituting a portion of the device shown in another position;

FIGURE 5 is a vertical sectional view taken along line 5—5 of FIGURE 3 in the direction indicated by arrows;

FIGURE 6 is a vertical sectional view taken along line 6—6 of FIGURE 3 in the direction indicated by arrows;

FIGURE 7 is a vertical sectional view taken along line 7—7 of FIGURE 6; and

Figure 8:
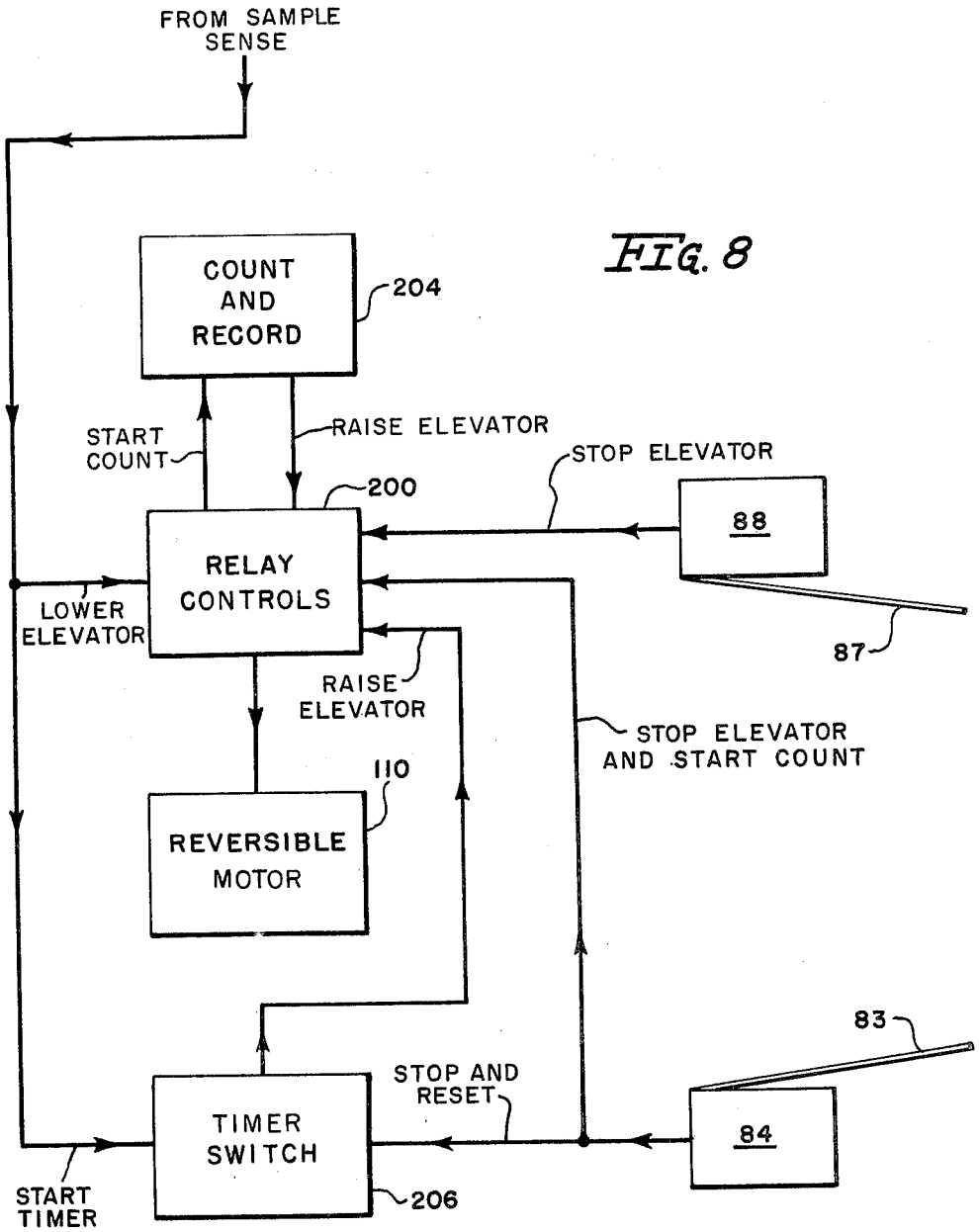
FIGURE 8 is a highly schematic diagram of the control circuits of the sample changer.

In the illustrated embodiment, a conveyor 10 is shown as storing and transporting a series of sample bottles or vials 12, the bottoms of which slide on the table surface 14 of table 16 as the conveyor moves. The latter is, of course, operated intermittently rather than continuously, depositing each successive bottle or vial 12 within an aperture 18 in the table 16, the bore of the aperture having an inwardly convergent tapered collar to aid the bottles 12 to readily enter, individually, into entrance 25 of a vertical passage 20 and to the counting chamber 19 of the scintillation counter sample changer. The conveyor 10 may be, as shown, a chain 24 comprising a series of pivotally interconnected links 26.

The bottles 12 contain the radioactive substance, normally beta-active, in a liquid scintillating solution which emits extremely small pulses of light which are detected and measured by placement adjacent to the cathode of a photomultiplier 28 surrounded by a radiation shield 30 surrounding the housing structure 32 in which the chamber 19 is formed.

A shutter assembly 34 has upper and lower plates 38 and 40, respectively, defining a chamber 41 containing a shutter plate 42 and having on the top and bottom, surrounding the passage 20, light-tight seals 44 seated under the top plate 38 and on a spring cup 46, the latter being biased upwardly by a spring 48. The radiation shield 30 with the housing structure 32 is supported by a platform 50.

Within the chamber 19 and passage 20 is disposed a reciprocable plunger or elevator 52 having a top table surface 54 for carrying the sample bottles 12 and having around its outer surface a plurality of light sealing rings 58 of felt material for close sealing engagement with the wall of the passage 20. A spring 60 engages the underside 61 of the upper portion 63 and at its lower end engages the top edge of a tube 62 supported in bearings 64 and 66. The tube 62 has a lower end 68 engaging a spring 70, the lower end of which abuts against an adjustable nut 72 on an end-threaded shaft 74 which passes through the tube or sleeve 62 as well as through the resilient mounting springs 60 and 70 and which is unitary with the upper portion 63 and forms therewith the overall elevator or plunger 52, such an arrangement providing a resilient mounting for the elevator or plunger 52 to guard against damage and provide for accurate adjustment thereof, the spring compression being adjustable by means of the nut 72.

The bottom of the elevator 52 is provided with an adjustable stop 76 for adjusting the lower limit position of the elevator. A cup 78 surrounds the lower end of the stub or shaft portion 74 and has an upper outer flange 80 having an under surface 72 engageable with the actuating arm 83 of a microswitch 84 and an upper surface 86 engageable with the activating arm 87 of a microswitch 88, the lower portion of the elevator or plunger 52 being surrounded by the housing 90 having an aperture 92 in which is a grommet 93 surrounding a cable end-fitting 94 threaded into the housing and receiving cable pin 96 of control-wire cable 95. The pin 96 abuts against a cam surface 98 of shaft portion 74, the surface 98 having a diagonal cam-drive surface portion 100, an upper outer surface portion 101, and a straight recessed slot surface portion 102. The pin 96 in engaging the cam surface 98 passes through a slot 104 in the tube or sleeve 62 which has on its opposed side a rack portion 106 engaging a pinion 108 driven by a reversible motor 110; a pin 109 on the shaft 74 slides in slot 104 and prevents rotation of the plunger 52 with respect to the drive sleeve or tube 62.

The cable 95, having a sheath 111, extending (see FIGURES 4 through 7) from the fitting 94 up to a clamp 112 attached to the fixed portion of the shutter assembly 34, is clamped in an enlarged opening 116 of a slot 118. The clamp 112 is preferably designed so that it cannot be severely overtightened, the enlarged opening 116 accomplishing this.

The cable 95, which has its sheath so clamped, has its inner control wire 123 extending from pin 96 to a crank arm 120 and has an end pin 122 seated in bore 124 of the crank 120. A biasing spring 130 is attached at one end 132 to a fixedly mounted screw 114 and at the other end 135 to the crank arm 120 by pin 134 passing through a slot 136 in the crank arm 120. The end of the crank arm opposite that in which the pin 122 seats (see FIGURE 7) has a slot 138 with an enlarged bore part 140 receiving a shaft or drive pin 142 which at its lower end receives a pin 144 extending through the drive pin 142 into each ear 146 and 148 defining the slot 138 and ears 146, 148 are tightened by a cap screw 150 to hold the shutter drive shaft 142 securely to the crank arm 120, pin 144 preventing rotation of the drive shaft 142 with respect to the crank 120. The upper portion of the drive shaft 142 is carried by bearings 152 and 154 in the upper and lower plates 38, 40 of the shutter assembly 34. The shutter plate 42 is fixed and keyed to a square-shaped drive lug 156 integrally formed on the drive shaft 142 by a square aperture 157. The shutter plate 42 is generally triangularly shaped and has the drive shaft 142 at the outer end 160 and has a semi-circular slot 162 along one side conforming generally to the shape of the passage 20.

The pin portion 96 of the cable 95 maintains a sliding engagement with the cam surface 98 or outer peripheral surface 101 of the shaft portion 74 of the elevator 52 under the urging of spring 130.

In normal operation, the samples are carried by the chain conveyor 10 and when one of the samples is exactly over the aperture 18 the actuator 160 of a sample-sensing switch 161 is engaged at the time that the elevator 52 has its top surface 54 aligned with the surface 14 of the table 16 at entrance 25 and starts the motor 110 driving the pinion 108 and thus the rack 106 to lower the elevator 52 within the passage 20 and carries the sample bottle 10 downwardly to a bottomed position at which time the bottom edge 82 of the flange 80 of cup 78 contacts the microswitch actuator 83 and stops the operation of the motor 110. In this descent, the pin 96 of the cable rides out of the cam slot surface 98, where it is seated when the top surface 54 of the elevator 52 is aligned with the top surface 14 of the table, to a position of engagement with the surface 101, as shown in FIGURE 1, such movement of the wire of the control cable 95 swinging the shutter plate 42 from the open position shown in dotted lines to the closed position shown in solid lines, as seen in FIGURE 3. The travel of the shutter plate 42 occurs when the pin 96 contacts the diagonal surface 100 of the cam slot 98 which occurs before the felt seals 58 leave the passage 20 and enter the chamber 19. When the measurement is completed, the motor 110 is actuated to start the elevator 52 upward, and the motor drive is terminated by the engagement of the lever 87 of microswitch 88 with the upper side 86 of the lug 80 and the next sample is brought in alignment with the aperture 18; the tested sample 12 is carried away through operation of the conveyor mechanism 24 through motor drive means (not shown).

However, should the edges of the sample bottle tend, in passing through the aperture 18, to become somehow lodged or jammed (for example, should the lower edge of the sample bottle or vial 12 be caught by the irregularities presented by the shutter structure as it is being lowered into the sample counting passage 20 by the elevator 52 or should a sample with a cap of overlarge diameter be accidentally incorporated in the conveyor batch) the shutter's closing is blocked by the bottle 12. The elevator is stopped by the pin 96 because of its connection to the shutter through the push-pull cable 95.

As thus far described, it will be seen that the construction and operation are generally similar to the corresponding portions of the device described in the earlier co-pending application of Meeder and Kus mentioned above, the principal difference lying in the firm, tight, and positive coupling of the pin 96 to the shutter 42. However, it must be observed that there are certain constructional features not visible in the representation of a drawing, and not previously described, which are required for satisfactory operation of the structure as thus far described. In the earlier device, the shutter was coupled to the control-wire cable by a readily slipping joint, rather than by the tight and rigid connection presently used. This sliding connection was provided for the dual purpose of protecting the shutter from damage and assuring against the crushing of samples by the application of excessive force by the shutter in the event of jamming. In the present construction, these same objects are achieved in a somewhat different manner. The motor 110 is selected from the various types of motors which can be obtained with the characteristic of being readily stalled upon the application of torque loads substantially in excess of their design rated torque, and being able to remain in this stalled condition for substantial periods without internal damage. Alternatively, a slightly more expensive design approach employs a slipping clutch capable of torque transmittal not substantially in excess of the torque required for normal operation of the plunger or elevator.

The illustrated cushioned or resilient mounting of the elevator or ram 52 on its drive tube 62 is highly advantageous in permitting the stalling of the motor by a sufficiently gradual application of force to prevent damage to its gear system. The locking of the elevator is of course occasioned very abruptly, when the shutter strikes the sample bottle. But the shock or impact thus produced is isolated from the gear system by the spring 60, which absorbs the abrupt impact sufficiently to protect the gears and the rack and pinion, all of which are isolated from the elevator by the shock-absorbing springs 60 and 70.

It will be observed that the stalling of the drive motor occasioned by the jamming of a sample in the shutter opening effectively prevents the entrance of light into the chamber at all times, since the light seal effected by the felt seals around the cylindrical upper end of the elevator necessarily remain within the upper passage at all times that the shutter is in any but the fully closed condition.

Although the structure just described in itself has substantial advantages, the invention further provides a rejection means for the jammed sample which permits essentially uninterrupted operation, with all normally and properly prepared subsequent samples being measured without adverse effect as a result of the earlier jamming. The basic operation of this portion or aspect of the invention utilizes the resultant stopping of the elevator in a novel type of rejection system in which the jamming of the sample is detected, in effect, as an equivalent to detection of the fact that no sample has arrived in the chamber, thus preventing the circumstance earlier described of having the entire system await the reaching of a count which cannot be reached because in fact there is no sample present in the chamber.

Effectively, in this aspect of the invention, the rejection is accomplished by detecting the fact that the first or lowering portion of the cycle of mechanical motion of the sample has not been completed in the normal fashion, and shifting the operation to the second normal portion of the mechanical cycle, i.e. the raising operation, thus returning to the conveyor the sample which has been unable to reach the chamber and permitting normal operation thereafter. This is done by initiating, at the commencement of the entire mechanical cycle, a timing interval which is somewhat longer than the normal time of the first portion of the cycle, i.e. the portion in which the sample is lowered. If the sample has not arrived in the chamber by the end of this preset time, the cycle is automatically reversed in much the same manner as if the sample had been actually counted to completion, i.e., at the end of the timing interval, the motor is activated in the direction raising the elevator.

The manner in which this is done is shown schematically in the control circuit diagram of FIGURE 8. As there shown, and already partially described, the operation of the "Sample Sense" switch 161 of FIG. 1 which initiates the mechanical cycle actuates the relay control system 200, as shown by the "Lower Elevator" control line symbol in FIGURE 8, thus initiating the starting of the reversible motor 110 in the downward direction, this action continuing in normal operation until striking of the actuator 83 of the lower limit switch 84 feeds to the control system 200 the control information "Stop Elevator and Start Count," which is used by the elevator to stop the motor and to control the counting and recording equipment 204 accordingly. The latter of course starts the actual counting portion of the overall cycle in response to the "Start Count" signal, and activates the returning of the elevator at the termination of this portion.

In addition to this normal type of operation common to the present device and the earlier device of the copending application, the cycle-initiating signal is also fed to a timer or time-control switch 206, this control function being indicated as "Start Timer" in a diagrammatic showing of FIGURE 8. Likewise, the output indication or signal of the lower limit switch 84 is used to control the timer switch by stopping the operation of the timer thus earlier initiated and resetting the timer 206, as again shown in the drawing. As mentioned above, the timer switch has a time interval somewhat longer than the normal time of the first portion of the mechanical cycle, a typical construction having a normal downward operating time of, say, 6 seconds, and having a timer switch interval of, say, 10 to 15 seconds. As shown by the control line from the time switch 206 to the relay controls 200, with the legend "Raise Elevator," as the control switch reaches the end of its timing interval, the reversible motor will be actuated in the upward direction in essentially the same manner as if the "Raise Elevator" signal were received from the counting and recording equipment 204 at the end of a counting cycle. However, if the control switch operation is interrupted by the actuation of the switch 84, fully normal operation ensues.

It will be observed upon study that the combination of the mechanical locking of the elevator in a position wherein it cannot strike the actuator 83 with the fact that the switch 84 is used for the "Stop and Reset" of the control switch 206 in effect is equivalent to, although much simpler than, other provisions which could be made for detecting the fact that the sample has not arrived in the chamber. In principle, the failure of arrival of the sample in the chamber could be detected by completely different means, such as photoelectric or switchsensing detection of the sample, either in the chamber or in the passage above the chamber, and such indications (positive or negative) could be coupled into the system shown for the inactivation of the timer 206 for normally arriving samples. However, the observation that the cause of non-delivery of the sample to the counting chamber is universally, when it occurs, the fact that the sample has become caught at the entrance, and thus blocks the shutter, makes this indirect, but extremely simple, mode of detecting the arrival (or non-arrival) of the sample fully effective for the purpose of stopping the timer (or failing to stop the timer) to permit normal operation (or restore normal operation for subsequent samples) in the system illustrated.

It will be understood that there are many other variants of the invention which will be seen by persons skilled in the art, some being obvious, and some becoming apparent only upon study. Accordingly, the protection to be afforded the invention should not be limited to the particular embodiment illustrated and described, but should extend to all structures as described in the appended claims and equivalents thereof.

What is claimed is:
1. A liquid scintillation sample changer comprising:
 (a) a conveyor bearing radioactive samples dispersed in a scintillating liquid,
 (b) a light-tight chamber having a photosensitive transducer therein,
 (c) a passage connecting the chamber and the conveyor,
 (d) a light-tight closure selectively opening and closing the outer end of the passage.
 (e) light-sealing means forming a light-tight seal in the passage inward of the closure,
 (f) mechanical connection means intercoupling the closure and the sealing means for maintaining the seal at all times when the closure is at least partially open,
 (g) cycled sample delivery means for first moving a sample from the conveyor through the passage to the chamber, and later moving the sample through the passage back to the conveyor,
 (h) a timer having a preset time longer than the first said portion of the cycle of the sample delivery means,
 (i) means responsive to the commencement of the cycle of the sample delivery means to activate the timer,
 (j) means responsive to the timer upon its operation for the preset time to operate the sample delivery means in said later portion of its cycle, and
 (k) means responsive to the delivery of the sample to the chamber to inactivate the timer, the timer thus commencing operation in every cycle of the changer, but affecting the cycling only of jammed samples.

2. A liquid scintillation sample changer comprising:
 (a) a conveyor bearing radioactive samples dispersed in a scintillating liquid,
 (b) a chamber below the conveyor having a photosensitive transducer therein,
 (c) a vertical passage connecting the chamber and the conveyor,
 (d) a light-tight closure selectively opening and closing the outer end of the passage at the conveyor,
 (e) an elevator reciprocable in the passage and adapted to form a light-tight seal in the passage inward of the closure and having an upper surface receiving a sample, (f) mechanical connection means intercoupling the closure and the elevator and maintaining the elevator in the passage at all times when the closure is at least partially open, (g) cycle means for first lowering the elevator through the passage, normally to the chamber, and later raising the elevator through the passage back to the conveyor, normally from the chamber, (h) a timer having a preset time longer than the first said portion of the normal cycle of the elevator, (i) means responsive to the commencement of the cycle of the elevator to activate the timer, (j) means responsive to the timer upon expiration of the preset time to operate the elevator in said later portion of its cycle, and (k) means responsive to the lowering of the elevator into the chamber to inactivate the timer, whereby the jamming of a sample in the closure automatically maintains the light seal in the chamber and raises the elevator to release the sample and restore it to the conveyor.

3. The sample changer of claim 2 having (1) the mechanical connection means comprising a rigid elongated control member coupled at its upper end portion to the closure and at its lower end portion to the elevator, at least one of said couplings being a sliding cam connection.

4. The sample changer of claim 2 having an elevator spring-mounted with respect to its drive, to isolate the drive from the abrupt impact produced by the mechanical connection means when the closure strikes a jammed sample.

5. A sample changer for measurements on radioactive samples comprising:

(a) a conveyor bearing radioactive samples, (b) a chamber having radioactivity sensing means therein, (c) a passage connecting the chamber and the conveyor, (d) cycled sample delivery means for first moving a sample from the conveyor through the passage to the chamber, and later moving the sample through the passage back to the conveyor, normally after completion of the measurement thereon, and means for then advancing the conveyor for positioning of the next sample, (e) a timer having a timing interval longer than the first said portion of a normal cycle of the sample delivery means, (f) means responsive to the commencement of the cycle of the sample delivery means to activate the timer, (g) means responsive to the timer upon expiration of its timing interval and independent of the sensing means to operate the sample delivery means in the direction moving the sample back to the conveyor, and (h) means responsive to the delivery of the sample to the chamber to inactivate and reset the timer and initiate the measurement of the sample, so that a sample failing to traverse the passage is returned to the conveyor without a measurement and the normal measurement of further samples proceeds.

6. An automatic sample changer for radioactive samples comprising (a) a conveyor adapted to carry successive samples to a measuring station, (b) a chamber spaced from the measuring station, (c) predetermined count means for measuring the activity of a sample within the chamber, (d) transfer means for first removing a sample from the conveyor and delivering it to the chamber, and later returning the sample from the chamber back to the conveyor, (e) control means responsive to the arrival of a sample at the station to actuate the transfer means for delivering the sample to the chamber and activating the measuring means on arrival of the sample in the chamber, and normally responsive to the measuring means to actuate the transfer means for return of the sample, (f) timing means actuated at the commencement of each removal of a sample from the conveyor, (g) means responsive to the continuous operation of the timing means for a predetermined time and independent of the measuring means to actuate the transfer means for returning the sample to the conveyor, and (h) means for stopping the operation of the timing means upon arrival of the sample in the chamber, (i) the transfer means following the same path in delivery and return, so that a sample failing to reach the chamber for the measurement thereof is returned to the conveyor.

7. An automatic sample changer for radioactive samples comprising (a) a conveyor adapted to carry successive samples to a measuring station, (b) a chamber vertically spaced from the measuring station, and connected thereto by a passage, (c) predetermined count means for measuring the activity of a sample within the chamber, (d) elevator means for first lowering a sample through the passage from the conveyor to the chamber, and later raising the sample from the chamber back to the conveyor, (e) control means responsive to the arrival of a sample at the station to lower the elevator and to activate the measuring means on completion of the lowering, and normally responsive to the measuring means to actuate the elevator for raising of the sample, (f) timing means actuated at the commencement of the lowering of the elevator, (g) means responsive to the continuous operation of the timing means for a predetermined time and independent of the measuring means to raise the elevator, and (h) means for stopping the timing means upon arrival of a sample in the chamber, so that a sample failing to discend through the passage is returned to the conveyor independently of the measuring means.

8. Apparatus for measurement of liquid scintillation radioactive samples comprising (a) a measuring station receiving samples to be measured, (b) a chamber beneath the measuring station and connected thereto by a passage, (c) predetermined count means including a photomultiplier for measuring the activity of a sample within the chamber, (d) an elevator reciprocable in the passage for first delivering a sample from the station to the chamber, and later returning the sample from the station back to the conveyor, (e) control means for activating the measuring means on arrival of a sample in the chamber, and normally responsive to the measuring means to actuate the raising of the elevator for return of the sample, (f) timing means actuated at the commencement of the lowering of the elevator, (g) means responsive to the continuous operation of the timing means for a predetermined time and independent of the measuring means to actuate the raising of the elevator, and (h) means for stopping the timing means upon arrival of a sample in the chamber, so that a sample failing to traverse the passage between the conveyor and the chamber is nevertheless returned to the conveyor.

9. The apparatus of claim 8 having a shutter in the top portion of the passage normally closing during descent of the elevator and mechanically coupled to the elevator to stop the elevator above the chamber when the shutter strikes a jammed sample, the means for stopping the timing means comprising a switch engaged by the elevator in the lowermost portion of its normal path.

10. An automatic measuring device for radioactive objects having
(a) a shielded chamber,
(b) a passage connecting the chamber to the exterior,
(c) mechanical means for carrying an object to be measured through the passage into the chamber, in a fixed time after actuation thereof,
(d) a predetermined count measuring means including a detector within the chamber,
(e) means responsive to the reaching of the predetermined count to actuate the carrying means in the opposite direction to return the object through the passage,
(f) a timer having a time interval longer than said fixed time and actuated substantially upon actuation of the carrying means,
(g) means responsive to the timer and independent of the measuring means to actuate the carrying means in said opposite direction,
(h) means responsive to jamming of an object in the passage to stop the carrying means in the passage, and
(i) means responsive to entry of the carrying means into the chamber to disable the timer.

11. In an automatic sample changer for liquid scintillation counting of the type having a sample conveyor, a counting chamber below the conveyor containing at least one light-sensitive detector, a vertical passage from the conveyor to the chamber, an opaque shutter in the passage, a sample-elevator reciprocable in the passage to move samples to and from the chamber, means to close the shutter as the elevator moves downward and to open the shutter as the elvator moves upward, and auxiliary light-seal means between the elevator and the wall of the passage sealing the chamber against light when the shutter is opened, the improved construction having a rigid coupling between the shutter and the elevator blocking the downward motion of the elevator upon blocking of the closing of the shutter by a sample, and having means thereupon to raise the elevator and open the shutter and restore the sample to the conveyor.

12. The sample changer of claim 11 wherein the raising means comprises an interval timer actuated at a time corresponding to commencement of the downward motion and actuating the elevator for upward motion upon continuous operation of the timer for a fixed interval after the commencement of downward motion of the elevator, said fixed interval being somewhat longer than the normal time of downward motion, and means responsive to completion of such normal downward motion to stop the timer.

13. In an automatic sample changer for liquid scintillation counting of the type having a sample conveyor delivering successive samples for counting, a counting chamber containing at least one photomultiplier beneath the conveyor, a vertical passage between the conveyor and the chamber, an elevator reciprocable through the passage to carry samples between the conveyor and the counting chamber, a shutter in the upper portion of the passage, a camming connection between the shutter and the elevator normally opening and closing the shutter as the elevator passes through the passage, light sealing means between the interior of the passage and the elevator normally blocking light from the chamber when the shutter is open, and cycling means including a motor drive for the elevator first lowering the elevator to introduce a sample into the chamber, then stopping during the counting of each sample, and thereafter raising the elevator, the improvement comprising a timer having a preset time interval initiated in correspondence with the initiation of the lowering of the elevator and extending beyond the time normally required for lowering of a sample into the chamber, means responsive to operation of the timer for the preset time interval and independent of the counting of the sample to initiate the raising of the elevator, and means responsive to completion of normal lowering of the elevator to stop the timer, the camming connection stalling the motor drive upon jamming of the shutter by a sample, so that an abnormal sample jamming the shutter is automatically returned to the conveyor in response to the timer and light is blocked from the chamber, but the timer is stopped before expiration of its preset interval in each normal cycle of the changer.

14. In an automatic sample changer for radioactivity measurements of the type having a conveyor and a counting chamber, a carrier having a sample-bearing portion reciprocable between the conveyor and the counting chamber, and cycle-controlled motive and actuating means for first moving the carrier in the direction to transport a sample from the conveyor to the counting chamber, then initiating the counting of the sample, and moving the carrier in the reverse direction to return the sample to the conveyor upon conclusion of the counting, the improvement characterized by means responsive to jamming of a sample in removal from the conveyor to stop said first motion of the carrier, and means responsive to the stopping of the carrier to then move the carrier in said reverse direction to return the sample to the conveyor uncounted and thus restore normal operation.

15. In an automatic sample changer for radioactivity measurements of the type having a conveyor and a counting chamber, a carrier having a sample-bearing portion reciprocable between the conveyor and the counting chamber, and cycle-controlled motive and actuating means for first moving the carrier in the direction to transport a sample from the conveyor to the counting chamber, then initiating the counting of the sample, and moving the carrier in the reverse direction to return the sample to the conveyor upon conclusion of the counting, the improvement characterized by means independent of the initiation of the counting to initiate moving the carrier in said reverse direction at a time after the normal time of delivery of each sample to the counting chamber, and means responsive to arrival of each sample in the counting chamber to disable the last-said means, so that any samples jamming in transport are returned to the conveyor without being counted, and normal operation is otherwise maintained.

References Cited by the Examiner

UNITED STATES PATENTS

| | | | |
|---|---|---|---|
| 2,907,881 | 10/1959 | Roucayrol et al. | 250—106 X |
| 2,924,718 | 2/1960 | Packard et al. | 250—106 X |
| 3,085,155 | 4/1963 | Kern et al. | 250—106 X |

OTHER REFERENCES

Elevator and Index Mechanism Handle Samples in Radiation Detector, by L. G. Soderholm, reprinted from August 4, 1961, Design News.

RALPH G. NILSON, *Primary Examiner.*

ARCHIE R. BORCHELT, *Examiner.*